Nov. 9, 1943.   L. JUUSTINEN   2,334,101
ASH SHOVEL AND CONVEYER
Filed Oct. 20, 1942

Leonard Juustinen, Inventor

By Christian L. Nielsen
Attorney

Patented Nov. 9, 1943

2,334,101

UNITED STATES PATENT OFFICE 2,334,101

ASH SHOVEL AND CONVEYER

Leonard Juustinen, Brooklyn, N. Y.

Application October 20, 1942, Serial No. 462,732

1 Claim. (Cl. 294—55)

This invention relates to a portable conveying receptacle and more particularly to a combined receptacle and shovel and it consists in the constructions, arrangements and combinations herein described and claimed.

It is the principal object of the invention to provide a shovel-like device which may be readily inserted into an ash-pit of a furnace or the like and so constructed that ashes disposed in the shovel will be substantially housed preventing ash and dust particles from emerging into the basement of the home when in use.

More specifically, it is an object of the invention to provide a shovel wherein a housing encloses the shovel blade, except for a front ash entrance opening; the shovel embodying a detachable handle and a carrying handle whereby the shovel may be readily carried to a point where the ashes are to be deposited.

Figure 1:
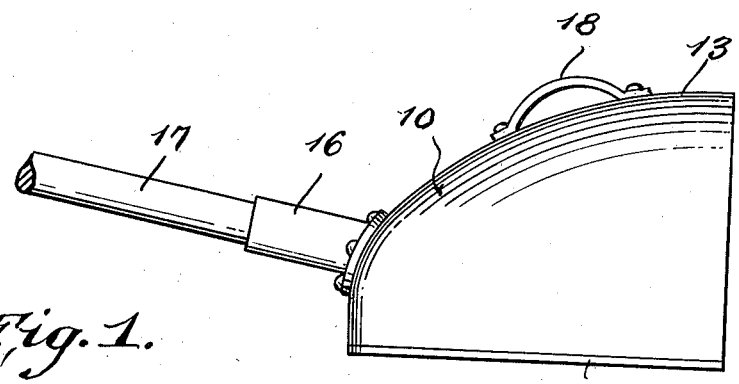
Figure 2:
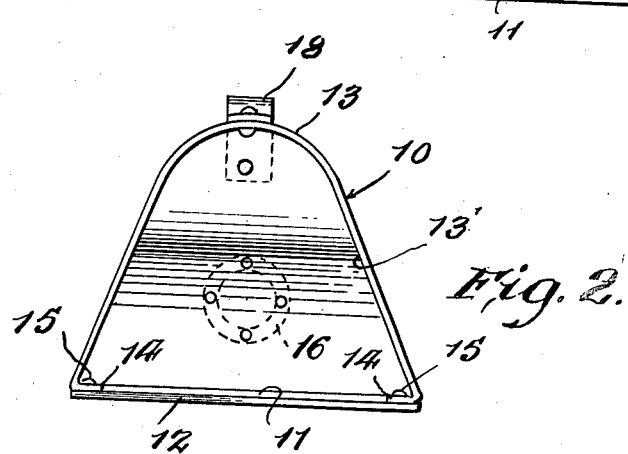
Figure 3:
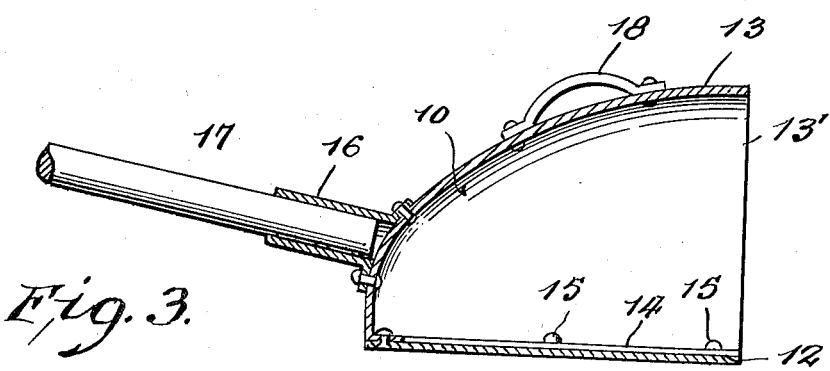

Additional objects, advantages and features of invention will be apparent from the following description and accompanying drawing, wherein, Figure 1 is a side elevation illustrating my invention, Figure 2 is a front elevation thereof, Figure 3 is a longitudinal sectional view of the device.

There is illustrated a shovel device 10 which is constructed of suitable gauge sheet metal and it consists of a planiform blade portion 11 which may be provided with a tapered front edge 12, to facilitate movement of ashes upon the blade.

A hood 13 is suitably fixed upon the blade 11 the hood having an open end 13' being substantially semi-circular in end elevation, the top wall and side walls tapering rearwardly to a point of juncture with the rear portion of the blade 11. In the present instance, the edges of the walls of the hood are inwardly turned, forming flanges 14 adapted to lie flush upon the blade to which they are riveted as at 15. The rivets are counter-sunk in the blade so that free sliding movement of the shovel upon a surface may be had.

Upon the rear portion of the hood 13 and positioned in the medial longitudinal axis of the hood there is secured a ferrule 16 extended at a slight upward angle to the longitudinal axis of the device. The ferrule 16 detachably receives an operating handle 17, and obviously a friction fit is provided in order that the handle will remain in the ferrule when the shovel is filled and being drawn backwardly from an ashpit or the like. However, the fit of the handle within the ferrule must be such that the handle can be removed by a rotating or similar motion.

Upon the top wall of the hood 13, a carrying handle 18 is secured, which is employed when carrying the shovel to a point where the ashes are to be deposited. It will be noted that the handle 18 extends in a medial longitudinal axis of the hood, providing an equalized balance of the shovel, as well as providing a natural grasp of the handle.

In use, the shovel is positioned upon the floor of a pit to be cleaned and advanced into the ashes by pressure upon the handle 17, causing the ashes to enter within the hood. The shovel may be retracted and again advanced until the shovel is filled. The shovel may now be withdrawn from the pit and the handle 17 is removed. The user may now grasp the handle 18 and carry the shovel and contents to any suitable depository. In emptying the shovel, one hand may grasp the handle 18, while the other hand may grip the ferrule 16. The shovel may thus be readily tipped to discharge the contents.

While I have shown and described my shovel specifically, this is by way of illustration only, and I consider as my own, all such modifications as fairly fall within the scope of the appended claim.

I claim:

As a new article of manufacture, an ash shovel and conveyer consisting of a hollow body member open on one end and having a broad flat blade portion, a ferrule on the end opposite the open end of the body and positioned in the medial longitudinal axis of the body and projecting a substantial distance outwardly therefrom to form a hand grip, an elongated handle frictionally yet detachably mounted in the ferrule, and a carrying handle on the upper wall of the body member, extending in the medial longitudinal axis of the body member.

LEONARD JUUSTINEN.